United States Patent [19]

Wright et al.

[11] Patent Number: 5,708,663

[45] Date of Patent: Jan. 13, 1998

[54] ISDN TERMINAL ADAPTER FOR USE WITH EXTERNAL MODEM AND EMPLOYING SOFTWARE-BASED SERIAL COMMUNICATION FRAMING FOR ISDN 'D' CHANNEL SIGNALING

[75] Inventors: Jonathan A. Wright; Paul G. Mc Elroy; James M. Glass, III, all of Huntsville, Ala.

[73] Assignee: Adtran, Inc., Huntsville, Ala.

[21] Appl. No.: 635,742

[22] Filed: Apr. 22, 1996

[51] Int. Cl.$^6$ .................................................. H04J 3/12
[52] U.S. Cl. ............................................ 370/524; 370/463
[58] Field of Search .................................. 370/264, 524, 370/522, 265, 463; 379/93, 94; 375/922

[56] References Cited

U.S. PATENT DOCUMENTS

| 5,305,312 | 4/1994 | Fornek et al. | 370/264 |
| 5,404,491 | 4/1995 | Huzenlaub et al. | 395/500 |
| 5,450,412 | 9/1995 | Takebayashi et al. | 370/524 |
| 5,483,530 | 1/1996 | Davis et al. | 370/524 |

*Primary Examiner*—Douglas W. Olms
*Assistant Examiner*—Ajit Patel

*Attorney, Agent, or Firm*—Charles E. Wands

[57] ABSTRACT

An ISDN terminal adapter is capable of providing both digital and analog communication connectivity between a customer's data terminal equipment (DTE) and a digital communication link. The adapter includes a digital (ISDN) communication transceiver for transmitting and receiving digital communication signals on the ISDN link. A first digital communication connector is coupled with the DTE. A second digital communication connector is coupled with the customer's modem. An analog communication connector is coupled with an analog port of the modem. An analog/digital communication interface is coupled between the analog communication connector and the digital communication transceiver. A serial communication exchange processor is coupled with the first and second digital communication connectors and the transceiver. For all-digital (ISDN) connectivity, the processor provides a first communication path, exclusive of the modem, between the first digital communication connector and the transceiver, so that digitally formatted communication may take place between the DTE and the ISDN link. For digital-analog connectivity, the processor provides a second communication path that makes use of the customer's external modem, between the first digital communication connector and the transceiver, for communications between the DTE and the ISDN link.

34 Claims, 3 Drawing Sheets

ISDN TERMINAL ADAPTER FOR USE WITH EXTERNAL MODEM AND EMPLOYING SOFTWARE-BASED SERIAL COMMUNICATION FRAMING FOR ISDN 'D' CHANNEL SIGNALING

FIELD OF THE INVENTION

The present invention relates in general to communication systems and is particularly directed to a new and improved terminal adapter, that is configured to provide connectivity between a digital communication circuit/link, such as an integrated services digital network (ISDN) circuit/link, and a user's digital terminal equipment (e.g. personal computer) that makes use of the user's (external) modem for telecommunications.

BACKGROUND OF THE INVENTION

Over the past several decades, the telecommunications industry has witnessed the extremely rapid growth and diversification of interconnect services for a continuously expanding base of users of digital terminal equipment, such as personal computers. When initially faced with the problem of providing communication connectivity between such digital terminal equipment and the already in-place analog POTS (plain old telephone service) network, the industry began offering digital/analog interfaces, or modems, to network customers. Current modem designs allow a digital terminal equipment user to choose from a variety of types and speeds, including modems that may be installed internally with the data terminal equipment, or those that are operated as external, stand-alone devices.

Now, although a modem allows the digital terminal equipment user access to an analog POTS network, the signal quality and data transport speed of analog circuits are limited, making such circuits less than ideal media for digital data communications. Indeed, faced with the vigorous demand for digital communication services by effectively every business, professional, educational and social institution, communication service providers now offer dedicated digital circuits (such as integrated services digital network (ISDN) links). Since digital circuits are capable of transporting multiple time division multiplexed digital channels at very high data rates, they have become the framework for what is currently known as the "internet".

Because ISDN communications are purely digital and employ a predefined data assembly and encoding format, an ISDN line cannot be directly accessed by either the serial digital port or the analog port of a conventional modem. Instead, it is necessary for a user to install an ISDN terminal adapter between the user's digital terminal equipment and the ISDN circuit/line. Compounding the customer's problem is the fact that many commercial information service providers (e.g., America On Line and Compuserve) use analog circuits, which are accessed by the use of a conventional modem. Thus, for the foreseeable future it is expected that digital terminal equipment users will require access to both analog and digital communication networks.

One proposal to meet this two-fold need is to provide an 'integrated' ISDN terminal adapter, which is selectively operative under software control to provide either conventional modem-based connectivity or all digital (ISDN-based) connectivity. For this purpose, as diagrammatically illustrated in FIG. 1, such an integrated ISDN terminal adapter 10 provides two data transmission paths therethrough between a user's data terminal equipment (DTE) 14 and a local subscriber loop 16. The first transmission path comprises a modem-based connectivity path 11, which is employed to provide conventional modem connectivity between the subscriber loop and the customer's data terminal equipment. The second transmission path comprises an all digital signalling path 12, which is employed to provide digital-digital connectivity between an ISDN link and the user's data terminal equipment.

Figure 1:
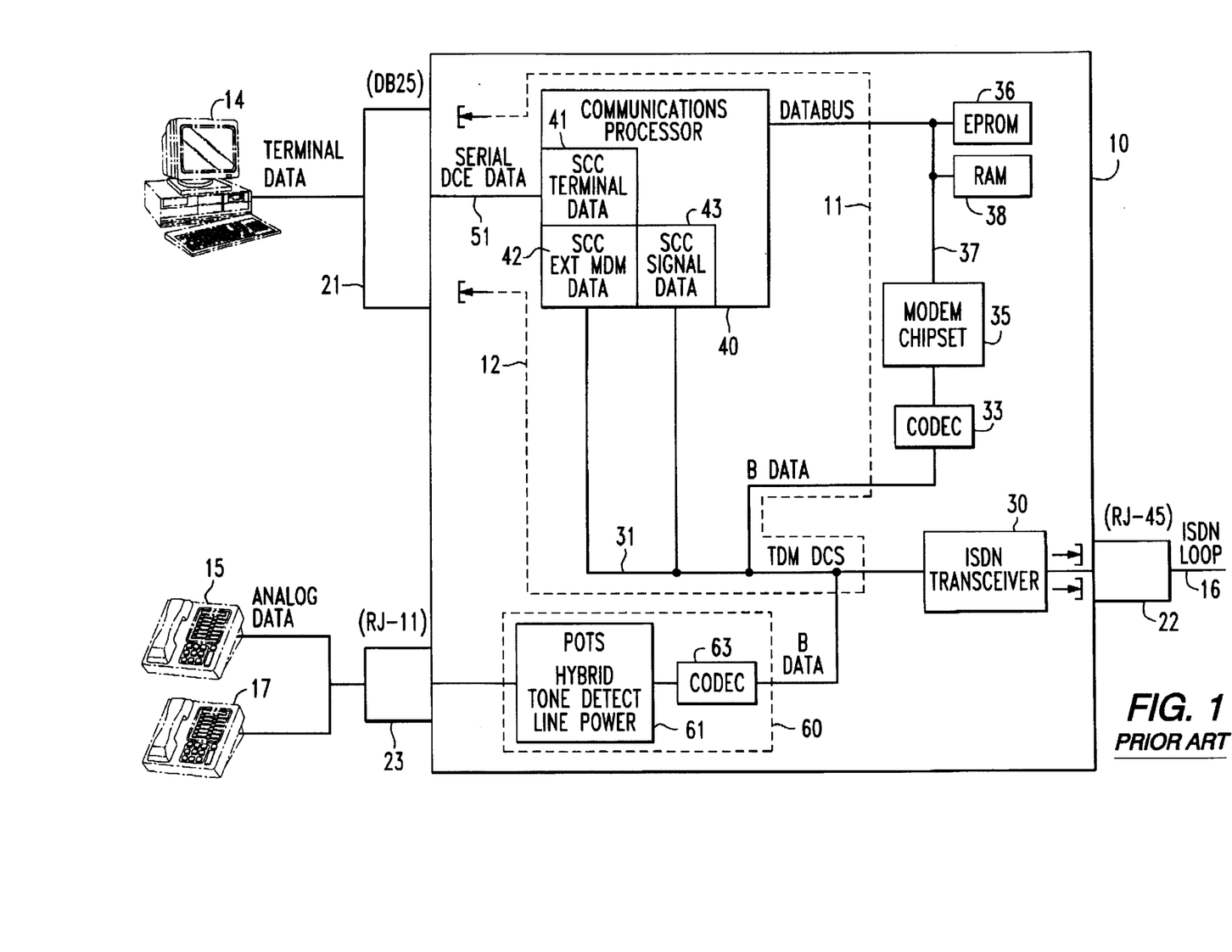
FIG. 1 diagrammatically illustrates a conventional integrated ISDN terminal adapter, which is selectively operative to provide either modem-based or ISDN-based connectivity between a user's data terminal equipment and a subscriber loop.

For this purpose, the terminal adapter 10 includes a digital communication transceiver, for example an ISDN transceiver 30, which is externally ported (on the network side of the adapter) to the subscriber loop 16 via a connector 22, such as an RJ-45 connector, and is internally ported to a time division multiplex (TDM) digital communication bus 31. The ISDN transceiver 30 is operative to transmit digital (ISDN-formatted) communication signals onto the local loop 16 and is operative to receive ISDN-formatted communication signals from the loop. To provide modem-based connectivity through the first path 11, the TDM communication bus 31 is coupled via a coder-decoder (CODEC) 33 and an associated modulator-demodulator (modem) chipset 35 to a data bus 37 of an internal serial communication exchange processor 40. Also coupled to data bus 37 are an EPROM 36 and RAM 38 associated with the execution of the communication software that drives the operation of communication processor 40.

The serial communication exchange processor 40 is equipped with a plurality of (three) serial communication controllers (SCCs) 41, 42 and 43, which are operative, under internal processor control, to provide serial digital communication connectivity between digital signal transport devices to which the SCCs are ported. In particular, SCC 41, used for terminal data connectivity with the user's data terminal equipment 14, is coupled via a serial data (such as RS 232 digital data) communication equipment (DCE) link 51 to a digital communication connector 21, such as a DB 25 connector, to which the user's data terminal equipment 14 is connected. SCC 42, used for bearer (B) channel data, and SCC 43, used for signalling (delta (D) channel) data, are coupled to the TDM bus 31. SCCs 41, 42 and 43 provide the digital-digital connectivity of the second path between the user's data terminal equipment 14 and the ISDN transceiver 30.

The terminal adapter 10 is also equipped with a third transmission path therethrough which provides analog-based signalling connectivity between subscriber loop connection port 22 an analog signal connection port 23, such as a standard RJ-11 telephone jack, to which customer analog communication equipment, shown at 15 and 17, is connected. The third transmission path includes a bidirectional analog-to-digital, digital-to-analog conversion unit (DAC) 60, such one including as a two-to-four wire hybrid 61 that is coupled to analog signalling connector 23, and an associated coder/decoder (CODEC) 63, which is coupled, to the TDM bus 31, so that it may interface digitized (bearer) channel data between the transceiver 30 and the DAC 60.

The communication control software which directs and supervises the operation of the terminal adapter of FIG. 1 is configured to provide communication connectivity between the user's data terminal equipment 14 and the ISDN line 16, based upon the format of the data signals that are sourced from or intended for the user's equipment. Selection of the appropriate path (modem-based path 11 or ISDN-based path 12) through the integrated terminal adapter is carried out by the terminal adapter's control processor, rather than the customer, who is usually technically unsophisticated and accustomed to doing nothing more than simply installing an analog modem in the customer's premises-located equipment, and plugging in a telephone connector to a modem port.

For example, in the case of a subscriber to an all digital communication service (an internet provider) placing a digital-digital call (such as an ISDN call to an ISDN circuit employed by the internet provider), the micro-controller within the serial communication exchange processor 40 uses the SCC 43 to conduct (D) channel signalling over the TDM bus 31 to ISDN transceiver 30 to set up or establish call connectivity. Then, once call connectivity has been established, the processor provides a serial communication path between SCC 41, which is ported to the data terminal equipment 14 via connector 21, and SCC 42, which is ported to TDM bus 31 and thereby to the ISDN transceiver 30, so that serial data communication may take place over the second transmission path 12 between the data terminal equipment 14 and the subscriber loop 16 via serially connected SCCs 41 and 42.

On the other hand, when the user places a call to an analog communication service provider, (for example, the user dials a commercial internet-interface provider, such as Compuserve or America On Line), the micro-controller within the serial communication exchange processor 40 will provide modem-based connectivity between the SCC 41 and the processor's data bus 37, to which the modem chipset 35 and its associated coded 33 are coupled, so that communications will be properly formatted for transmission over the first path 11 to the analog modem-based communications provider.

Now, although such an integrated terminal adapter enables the user to access both a conventional POTS line and an ISDN line, it does so at a price, including not only the fact that the customer's modem, which had previously given the user at least POTS line connectivity, is now treated as nothing more than an unused relic, but the user must now bear the added cost of the internal modem chipset.

SUMMARY OF THE INVENTION

In accordance with the present invention, the above-described objective of providing a customer's digital terminal equipment (DTE) with access to both analog and digital communication networks, without requiring that the customer effectively 'buy another modem' (chipset internal of the adapter), is successfully achieved by a new and improved terminal adapter having no internal modem of its own. Instead, the terminal adapter of the present invention is configured to make use of the customer's own modem (either internal of the customer's data terminal equipment or an external stand alone device), thereby eliminating a major shortcoming of the integrated terminal adapter solution which, as described above, effectively requires that the customer discard his own modem and pay an additional cost associated with the internal modem chipset of the integrated terminal adapter.

For this purpose, the terminal adapter of the present invention comprises a digital communication transceiver, such as an integrated services digital network (ISDN) transceiver, which connects with a digital communication circuit/link, and transmits and receives digital signals on that link. On its data terminal equipment side, the terminal adapter contains a first digital communication connector that provides serial data connectivity with the user's data terminal equipment, and a second digital communication connector coupled with a user's external modem. To provide analog signal connectivity with the user's modem, the analog port of an internal modem in the user's data terminal equipment, or the analog port of a piece of analog POTS equipment, the terminal adapter further includes an analog communication connector.

To supply digital-digital communication connectivity between the user's data terminal equipment and the ISDN transceiver, the terminal adapter includes a serial communication exchange processor. The processor is equipped with a plurality of serial communication controllers (SCCs), which provide serial digital communication connectivity between external digital signal transport devices to which the SCCs are ported. A first SCC is coupled to the first digital communication connector to which the user's data terminal equipment. A second SCC is ported to the second serial data connector and the third SCC is ported to a TDM bus to which the digital communication transceiver is coupled.

To provide analog-based signalling connectivity between the subscriber loop connection port and the analog signal connection port, the terminal adapter further includes a first bidirectional analog-to-digital, digital-to-analog conversion unit (DAC), such as one containing a two-to-four wire hybrid coupled to the analog signalling connector, and an associated CODEC coupled to the TDM bus, so that it may interface digitized (bearer) channel data between the transceiver and the DAC.

The terminal adapter of the first embodiment also includes an auxiliary serial communication controller unit, which is coupled to the processor bus and contains a plurality of auxiliary serial communication controllers that interface bearer (B) channel data with the TDM bus to the ISDN transceiver for digital-digital (ISDN) communication between the data terminal equipment and the subscriber loop.

The terminal adapter also provides a fourth transmission path for analog-based signalling connectivity between subscriber loop connection port and the analog signal connection port, to which customer POTS equipment is connected. As with the case of the third transmission path for the external modem, the fourth transmission path includes a bidirectional DAC, to interface digitized (bearer) channel data between the transceiver and the analog equipment.

Once installed with user's data terminal equipment and an associated modem—either external or one internal to the DTE, the terminal adapter provides full digital communication connectivity between the user's DTE and the local subscriber loop irrespective of the format of the signals sourced from or intended for the user's equipment. For an outgoing ISDN call, (D) channel signalling is conducted from the third SCC over the TDM bus to the ISDN transceiver in order to establish call connectivity over the local loop to the destination ISDN circuit.

With call connectivity established, the processor provides a serial communication path through the first SCC to the data terminal equipment and the processor bus to the auxiliary serial communication controllers of the auxiliary serial communication controller unit for the exchange of bearer (B) channel data via the TDM bus with the ISDN transceiver.

For an analog modem-based call, rather than provide ISDN connectivity through the processor to the auxiliary SCC unit and the TDM bus to the ISDN transceiver, a serial communication path is established between the first SCC and the second SCC to which the user's external modem is connected. Once the call is connected, serial data from the DTE is converted into analog format by the user's external modem and output from its analog port to a terminal adapter analog connector The processor also provides control signals to the codec circuitry within the DAC, so that the modem-based analog data from the external modem may be digitized and formatted for application over the TDM bus to the ISDN transceiver.

In a second embodiment of the terminal adapter, an auxiliary SCC unit is not used; instead, the terminal adapter employs a digital data multiplexer—demultiplexer, the communication path selectivity through which is controlled by the processor to provide shared digital communication connectivity between the first and second serial data communication connectors, and the first serial communication controller of the serial communication exchange processor. The second and third serial communication controllers of the processor are used to interface bearer (B) channel data via the TDM bus with transceiver.

In the second embodiment, advantage is taken of the availability of a high speed data port currently provided by the ISDN transceiver, which makes it possible to directly access the D channel data by means of a (non-maskable) interrupt port of the serial communication exchange processor. As a consequence, serial communication framing for the ISDN D channel may be implemented in software executed by the processor, thereby eliminating one of the serial communication controllers, that would otherwise be provided by the auxiliary SCC unit of the first embodiment. This combination of digital communication capabilities enables the terminal adapter configuration of the second embodiment to provide effectively the same digital data connectivity as that of the first embodiment, but at a reduced cost.

On the data terminal equipment side of the terminal adapter, the multiplexer provides one of three available communication paths with the first data communication connector, the second data communication connector and the first serial communication controller. A first of these three paths is a default mode path and provides bidirectional digital data connectivity path between the user's data terminal equipment and the first SCC. This first path is used in the course of an ISDN call to provide digital communication mode bearer channel connectivity between the user's DTE and the TDM bus to transceiver.

A second path provides digital data connectivity between the first serial connector to the user's external modem and the first SCC. This second path is usable in conjunction with the first path to enable the user to program parameter settings of the external modem, by sourcing commands from the user's data terminal equipment to the serial communication exchange processor over the first path through the multiplexer. The serial communication processor routes the commands over the second path through the multiplexer to the modem, reads the response, and routes the response over the first path to the user's DTE to confirm the intended modem parameter settings.

A third path through the multiplexer provides digital data connectivity between the user's data terminal equipment and the external modem, for the analog mode of operation, by-passing participation by the first serial communication controller. As in the first embodiment, analog channel data connectivity through the terminal adapter is provided by means of analog communication connector, to which the user's external modem or the DTE's internal modem is connected is ported. Analog-based signalling connectivity between the subscriber loop connector and the analog connector is effected through a first bidirectional DAC, which is coupled to the TDM bus, so that it may interface digitized (bearer) channel data between the transceiver and the user's equipment. As in the first embodiment, the second embodiment of the terminal adapter includes a fourth transmission path for analog-based signalling connectivity between subscriber loop connection port and a further analog signal connection port to which customer analog communication equipment is connected.

In operation, for an outgoing ISDN call, transmission of the formatted D channel data is performed at the interrupt level by the control processor, with one byte of ISDN D channel data being stored in a random access memory buffer every 500 microseconds. The data is framed in accordance with the employed serial communication framing format. For HDLC framing, zero insertion and deletion are employed to ensure that the bit pattern of the delimiter flag does not occur in fields between flags. The D channel data is ported via the interrupt pin to the high speed link to the ISDN transceiver, in order to set up call connectivity over the local loop to the destination ISDN circuit. Once call connectivity has been established, the processor provides a serial communication path including the first SCC and the first path through the multiplexer to the data terminal equipment and the second and third serial communication controllers, which interface bearer (B) channel data via the TDM bus with the transceiver.

For an analog call, rather than provide ISDN connectivity via the second and third SCCs, the processor will establish the third path connection through the multiplexer, so that a loop connection is provided from the first serial data connector through the multiplexer to the second serial data connector, and exclusive of a path that includes the first SCC. As a result, the user's DTE is effectively in direct serial communication with the external modem, so that data from the DTE is converted into analog format by the modem and output from its analog port to the terminal adapter's analog connector to the DAC. The micro-controller of the serial communication exchange processor provides control signals to the codec circuitry within the DAC, so that the analog data supplied to the analog connector is digitized by the DAC and coupled to the ISDN transceiver, which interfaces the digitized (bearer) channel data onto the subscriber loop.

DETAILED DESCRIPTION

Before describing in detail the new and improved ISDN terminal adapter in accordance with the present invention, it should be observed that the invention resides primarily in what is effectively a prescribed arrangement of conventional communication circuits, associated digital signal processing components, and attendant supervisory control circuitry that controls the operation of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

As pointed out previously, the terminal adapter of the present invention is configured not only to provide digital communication (e.g., ISDN) connectivity between data terminal equipment and a digital communication link, but is configured to make use of the customer's own modem (which may be either external stand alone device or installed as an internal modem within the user's data terminal equipment) for analog connectivity, and thus eliminates a major drawback of the above described integrated terminal adapter proposal of not being able to use the customer's modem and requiring that the customer buy another modem (the modem chipset that is installed in the integrated terminal adapter).

Figure 2:
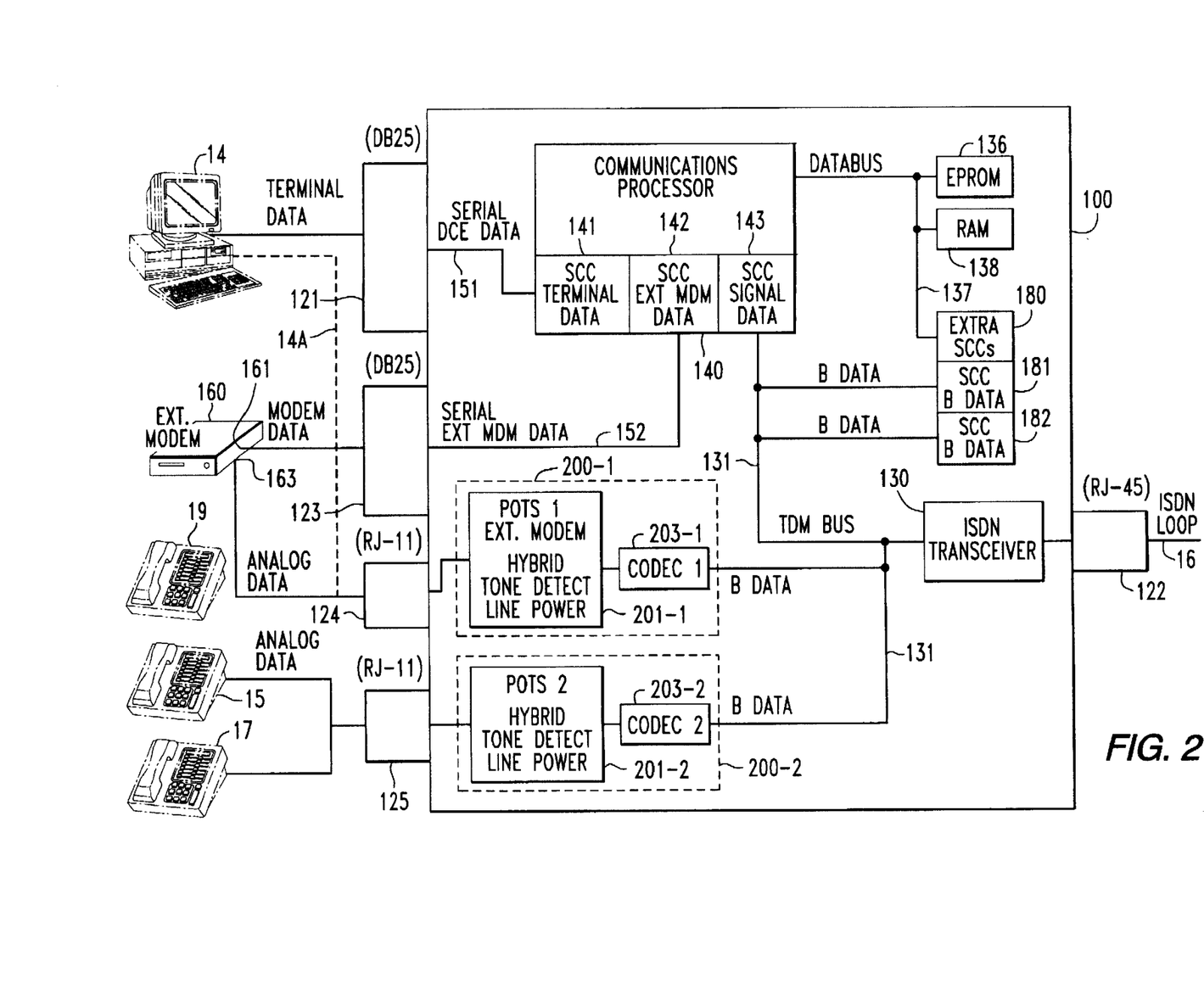
FIG. 2 diagrammatically illustrates a first embodiment of an ISDN terminal adapter of the present invention.

For this purpose, as diagrammatically illustrated in FIG. 2, a first embodiment of the terminal adapter 100 of the present invention comprises a digital communication (ISDN) transceiver 130, for example a model MC 145472 U-chip, manufactured by Motorola Inc. On the network side of the terminal adapter, the ISDN transceiver 130 has a network port 122, such as an RJ-45 connector, connected to the local subscriber loop 16.

As in the terminal adapter 10 of FIG. 1, ISDN transceiver 130 is operative to transmit digital (e.g., ISDN-formatted) communication signals onto the local loop 16 and is operative to receive digitally (ISDN) formatted communication signals from the loop.

On its data terminal equipment side, terminal adapter 100 contains a pair of digital signal communication connectors, such as DB 25 connectors, including a first digital communication connector 121, that provides serial data connectivity with the user's data terminal equipment 14, and a second (DB 25) digital communication connector 123 that is arranged to be coupled with a serial data communication port 161 of a user's external modem 160. To provide analog signal connectivity with the user's modem, whether it be the analog port 163 of the user's external modem 160, the analog port of an internal modem in the user's data terminal equipment 14, the analog link to which is shown by broken line link 14A, or the analog port of a piece of analog POTS equipment, shown at 19, the terminal adapter 100 further includes an analog communication connector 124, such as a standard RJ-11 telephone jack.

In order to provide digital-digital communication connectivity between the user's data terminal equipment 14 and transceiver 130, the terminal adapter 100 includes a serial communication exchange processor 140 (such as a Motorola MC68302 communication processor) having an associated EPROM 136 and RAM 138 coupled to a processor data bus 137. EPROM 136 and RAM 138 are associated with the execution of the communication software that drives the operation of communication processor 140.

Processor 140 is equipped with a plurality of (three) serial communication controllers (SCCs) 141, 142 and 143, which are operative, under internal processor control, to provide serial digital communication connectivity between external digital signal transport devices to which the SCCs are ported. In particular, SCC 141, used for terminal data connectivity with the user's data terminal equipment 14, is coupled via a serial data (e.g., RS 232) communication link 151 to digital communication connector 121, to which the user's data terminal equipment 14 is connected. SCC 142 is ported via link 152 to serial data connector 123, and SCC 143 is ported to a TDM bus 131, to which the digital communication transceiver 130 is coupled. As will be described, similar to the SCC 43 in the terminal adapter of FIG. 1, SCC 143 is operative to conduct call connectivity ((D) channel) signalling over the TDM bus 131 with the ISDN transceiver 130.

To provide analog-based signalling connectivity between the subscriber loop connection port 122 and the analog signal connection port 123, the terminal adapter further includes a first bidirectional analog-to-digital, digital-to-analog conversion unit (DAC) 200-1, containing a two-to-four wire hybrid 201-1 that is coupled to analog signalling connector 124, and an associated coder/decoder (CODEC) 203-1, which is coupled to the TDM bus 31, so that it may interface digitized (bearer) channel data between the transceiver 130 and the DAC 200.

The terminal adapter of the first embodiment of FIG. 2 also includes an auxiliary serial communication controller unit 180, such as a (Motorola) digital data link chip (DDLC), which is coupled to the processor bus 137 and contains a pair of auxiliary serial communication controllers 181 and 182, that serve to interface bearer (B) channel data with the TDM bus 131 to the ISDN transceiver 130 for the case of digital-digital (ISDN) communication between the data terminal equipment and the subscriber loop.

The terminal adapter 100 also provides a fourth transmission path for analog-based signalling connectivity between subscriber loop connection port 22 and analog signal connection port 125, to which customer analog communication equipment, shown at 17 and 19, is connected. As with the case of the third transmission path for the external modem 160, the fourth transmission path includes a bidirectional analog-to-digital, digital-to-analog conversion unit (DAC) 200-2, which may be configured identically to DAC 200-1 to include a two-to-four wire hybrid 201-2 coupled to analog signalling connector 125, and an associated coder/decoder (CODEC) 203-2 is coupled to the TDM bus 31, so that it may interface digitized (bearer) channel data between the transceiver 130 and the DAC 200-2.

Once installed with a user's data terminal equipment 14 and an associated modem—either the external modem 160 or a modem internal to the DTE 14, the terminal adapter 100 diagrammatically illustrated in FIG. 2 is operative to provide full digital communication connectivity between the user's DTE 14 and the local subscriber loop 16, irrespective of the format of the signals sourced from or intended for the user's equipment. In the following description of the operation of the terminal adapter, it will be assumed that the user has an external modem 160, the digital communication port 161 of which is connected to connector 123 and the analog port 163 of which is connected to analog connector 124 of the terminal adapter 100. The case of an internal modem is substantially the same as that for the external modem, except that there is no connection between (DB 25) connector 123 and the user's DTE 14.

Considering first the case of an outgoing ISDN call, as the call is initially placed, the micro-controller within the serial communication exchange processor 140 will decode the contents of the AT command at the beginning of the asynchronously sourced transmission from the DTE 14 as an ISDN call. It then uses the SCC 143 to conduct (D) channel signalling over the TDM bus 131 to the ISDN transceiver 130, in order to set up or establish call connectivity over the local loop to the destination ISDN circuit. Then, once call connectivity has been established, the processor provides a serial communication path between SCC 141, which is ported to the data terminal equipment 14 via connector 121, and processor bus 137 to the auxiliary serial communication controllers 181 and 182 of the auxiliary serial communication controller unit 180, for the exchange of bearer (B) channel data via the TDM bus 131 with the ISDN transceiver 130.

In the receive or incoming direction from the local ISDN loop 16, the signalling (D) channel portion of the ISDN signals received by transceiver 130 will be coupled over TDM bus 131 to SCC 163, to set up the call, and the bearer (B) channel data received by the auxiliary SCC unit 180 will be coupled over the processor data bus 137 to the SCC 141 for delivery via connector 121 to the user's data terminal equipment 14.

For the case of the user placing an analog modem-based call (for example, dialing a commercial internet interface provider, such as Compuserve or America On Line, as mentioned above), when the micro-controller within the serial communication exchange processor 140 decodes the AT command as an analog call, rather than provide the above-described ISDN connectivity through the processor 140 to the auxiliary SCC unit 180 and the TDM bus, the serial communication exchange processor 140 establishes a serial communication path between SCC 141 (to which the COM port of the user's data terminal equipment 14 is connected by means of DB 25 connector 121) and SCC 142, to which the digital port 161 of the user's external modem 160 is connected by way of digital communication connector 123.

Once the call is connected, serial (RS-232) data from the DTE 14 is converted into analog format by the user's external modem 160 and output from its analog port 163 to the terminal adapter's RJ 11 jack 124. In addition, the micro-controller of serial communication exchange processor 140 is operative to provide control signals to the codec circuitry 203-1 within DAC 200-1, so that the modem-based analog data supplied to port 124 from external modem 160 may be digitized and formatted for application over the TDM bus 131 to the ISDN transceiver 130.

In the incoming or return direction from a POTS line associated server at the far end of the communication network to which the local loop 16 is connected, the bearer (B) channel signals received from the local loop 16 by transceiver 130 are converted into analog format by DAC 200-1, and output via analog connector 124 to the analog port 163 of modem 160. Modem 160 outputs RS-232 data from port 161 to the DB 25 connector 123 of the terminal adapter, where the data is passed from SCC 142 to SCC 141 for application via connector 121 to the COM port of the user's DTE 14.

As pointed out above, where the user's data terminal equipment uses an internal modem, the foregoing operation is substantially the same as that for the external modem 160, except that there is no connection between (DB 25) connector 123 and user equipment. For the case of an ISDN call, the user will have designated whichever port (e.g., COM 1 or COM 2) is connected to the connector 121 of the terminal adapter. The operation for an ISDN call is identical to that described above, as all connectivity takes place through the communication exchange processor 140 and associated auxiliary SCC unit 180, without use of any modem.

For the case of an analog call, the user will have designated the communication port (e.g., COM 2 or COM 1) to which the DTE's internal modem is connected. The call will be directly applied from the internal modem's analog port to the analog connector 124 and routed through DAC 200-1 to transceiver 130, which interfaces the digitized (bearer) channel data from the DAC 200-1 onto the ISDN link 16, as described above. In the incoming or return direction from a POTS line associated server at the far end of the communication network to which the local loop 16 is connected, the bearer (B) channel signals received from the local loop 16 by transceiver 30 are converted into analog format by the DAC 200-1 and output via analog connector 124 to the analog port of the DTE's internal modem.

Figure 3:
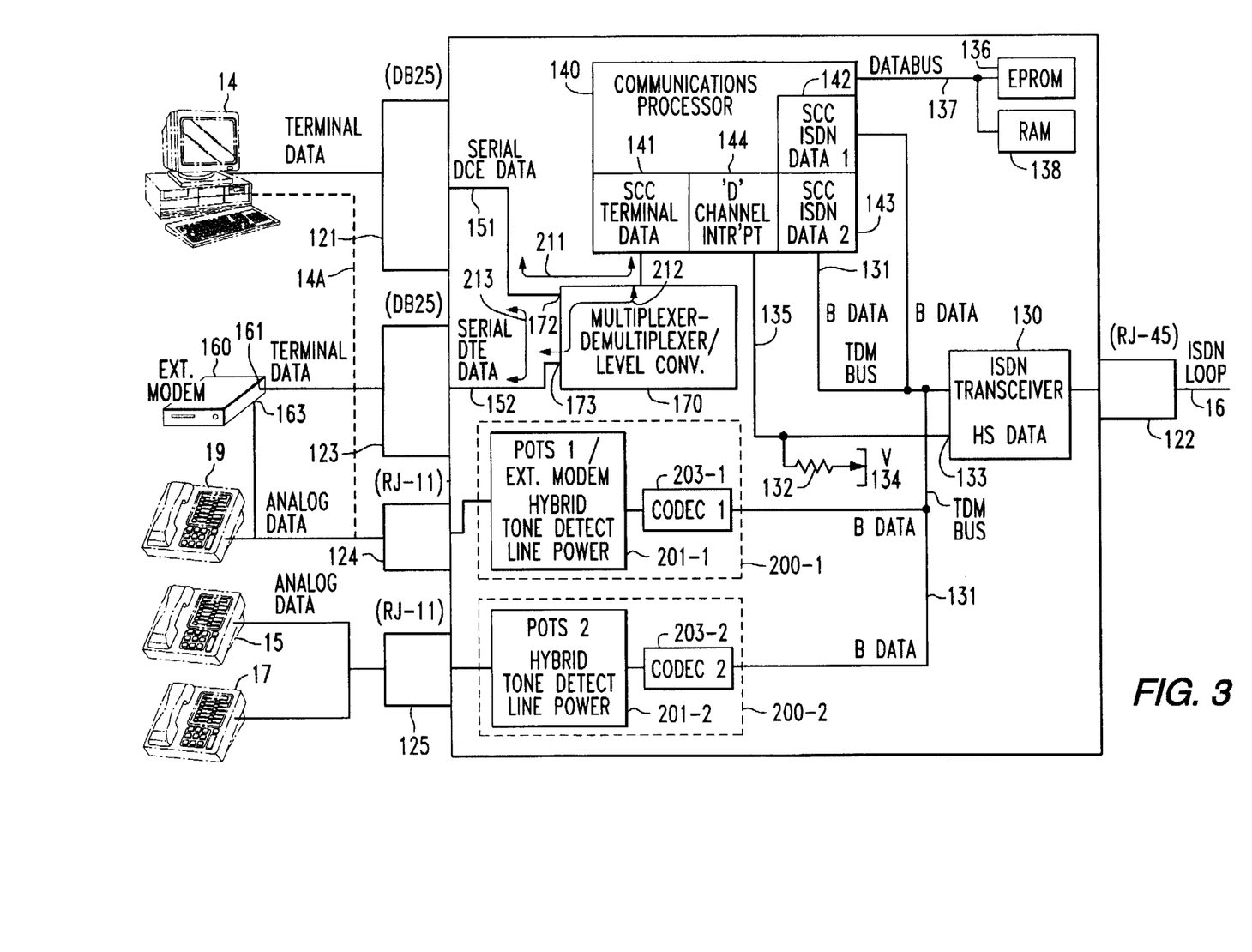
FIG. 3 diagrammatically illustrates a second embodiment of an ISDN terminal adapter of the present invention.

In accordance with a second embodiment of the terminal adapter of the present invention, diagrammatically illustrated in FIG. 3, advantage is taken of the availability of a high speed data port currently provided by at least one commercial ISDN transceiver. This high speed data port makes it possible to directly access the D channel data by means of a (non-maskable) interrupt port of the serial communication exchange processor. As a consequence, serial communication framing for the ISDN D channel may be implemented in software executed by the processor, thereby eliminating one of the serial communication controllers, that would otherwise be provided by the auxiliary SCC unit 180 of the first embodiment.

In addition, the second embodiment employs a conventionally configured, digital data multiplexer demultiplexer (MUX/DEMUX) 170, the communication path selectivity of which is controlled by serial communication exchange processor 140, to provide shared digital communication connectivity between connectors 121 and 123 and the first serial communication controller 141 of the serial communication exchange processor 140. The second and third serial communication controllers 142 and 143 of the serial communication exchange processor 140 are used to interface bearer (B) channel data via the TDM bus 131 with transceiver 130.

More particularly, in the second embodiment of the invention, shown in FIG. 3, the ISDN transceiver 130 has a high speed access (interrupt) port 133, which is directly connected via a dedicated link 135 to a non-maskable interrupt, input/output (I/O) port 144 of the serial communication exchange processor 140. As a non-limiting example, ISDN transceiver 130 may comprise a Motorola model XC145572 ISDN U chip. Because the interrupt pin/port 133 of the transceiver 130 is an open-collector pin, it is pulled high (for example, by means of a 10 KΩ resistor 132 coupled to a high logic level voltage rail 134).

As noted above, serial communication framing (e.g., high level data link control (HDLC) framing) for the ISDN D channel is performed in software by the serial communication exchange processor 140. Processor 140 receives the raw D channel data supplied over link 135 from the interrupt port 133 of the transceiver 130, and frames the D channel data after receiving a prescribed number of bytes equal to its internal receive buffer. Processor 140 also performs serial communication framing in the transmit direction. For ISDN signalling, the D channel is a 16 kb/s interface; as a consequence, the processor 140 can expect to receive or transmit one byte of D channel data via interrupt port 144 every 500 microseconds.

Namely, reception and transmission of the formatted D channel data is performed at the interrupt level by the serial communication exchange processor 140, with one byte of ISDN D channel data being stored in a random access memory 138 every 500 microseconds. Processor 140 then frames the data in accordance with the employed serial communication framing format. For HDLC framing, as a non-limiting example, zero insertion and deletion (bit-stuffing) are employed to ensure that the bit pattern of the delimiter flag (0×7E) does not occur in fields between flags.

The use of such interrupt-driven I/O pin 144 of the processor 140 for D channel signalling with the high speed data port of the ISDN transceiver 130, in combination with the installation of the MUX/DEMUX 170, enables the terminal adapter configuration of the second embodiment to provide effectively the same digital data connectivity as that of the first embodiment, but at a reduced cost and printed circuit board occupancy.

On the data terminal equipment side of the embodiment of the terminal adapter shown in FIG. 3, digital data MUX/DEMUX 70 provides one of three available communication paths with data communication connector 121, data communication connector 123 and serial communication controller 141.

A first of these three paths, shown at 211, is a default mode path and provides bidirectional digital data connectivity path between the COM port of the user's data terminal equipment 14 and SCC 141. As will be described, this first path 211 is used in the course of an ISDN call to provide digital communication mode bearer channel connectivity between the user's DTE 14 (via SCC 141 and SCCs 142 and 143) and the TDM bus to transceiver 130.

A second path 212 provides digital data connectivity between the connector 123 to the user's external modem 160 and SCC 141. This second path 212 is usable in conjunction with the first path 211, to enable the user to program parameter settings of the external modem 160, by sourcing commands from the user's data terminal equipment 14 to the serial communication exchange processor 140 over path 211 through MUX/DEMUX 170. The processor 140, in turn, then routes the commands over path 212 through MUX/DEMUX 170 to the modem 160, reads the response, and routes the response over path 211 to the user's DTE 14, to confirm the intended modem parameter settings.

A third path 213 through the MUX/DEMUX 170 provides digital data connectivity between the COM port of the user's data terminal equipment 14 and the digital data port 161 of the user's modem 160, for the analog mode of operation, by-passing participation by the serial communication controller 141.

As in the first embodiment of FIG. 2, analog channel data connectivity through the terminal adapter, proper, is provided by means of analog communication connector 124, to which the analog port 163 of the user's external modem 160 or the DTE's internal modem is connected is ported.

Analog-based signalling connectivity between the subscriber loop connector 122 and the analog connector 124 is effected through a first bidirectional analog-to-digital, digital-to-analog conversion unit (DAC) 200-1, containing a two-to-four wire hybrid 201-1 that is coupled to analog signalling connector 124, and an associated coder/decoder (CODEC) 203-1, which is coupled to the TDM bus 31, so that it may interface digitized (bearer) channel data between the transceiver 130 and the DAC 200.

As in the first embodiment of FIG. 2, the terminal adapter of the embodiment of FIG. 3 also provides a fourth transmission path for analog-based signalling connectivity between subscriber loop connection port 22 and analog signal connection port 125, to which customer analog communication equipment, shown at 17 and 19, is connected. As described previously, as with the case of the third transmission path for the external modem 160, the fourth transmission path includes a bidirectional analog-to-digital, digital-to-analog conversion unit (DAC) 200-2.

DAC 200-2 may be configured identically to DAC 200-1 to include a two-to-four wire hybrid 201-2 coupled to analog signalling connector 125, and an associated coder/decoder (CODEC) 203-2 is coupled to the TDM bus 31, so that it may interface digitized (bearer) channel data between the transceiver 130 and the DAC 200-2.

In operation, for the default path 211 through multiplexer 170, and an outgoing ISDN call being placed, the micro-controller within the serial communication exchange processor 140 will decode the contents of the AT command at the beginning of the asynchronously sourced transmission from the DTE 14 as an ISDN call. As described above, transmission of the formatted D channel data is performed at the interrupt level by processor 140, with one byte of ISDN D channel data being stored in memory every 500 microseconds. As described above, the data is framed in accordance with the serial communication framing format, such as HDLC framing as a non-limiting example, with zero insertion and deletion (bit-stuffing) to ensure that the bit pattern of the delimiter flag (0×7E) does not occur in fields between flags. The D channel data is ported via interrupt pin 144 to the high speed link 135 to the ISDN transceiver 130, in order to set up call connectivity over the local loop to the destination ISDN circuit.

Once call connectivity has been established, the processor provides a serial communication path between SCC 141, which is ported through path 211 of multiplexer 170 to the data terminal equipment 14 via connector 121, and serial communication controllers 142 and 143, which interface bearer (B) channel data via the TDM bus with the transceiver 130.

In the receive or incoming direction from the local ISDN loop 16, successive bytes of the signalling (D) channel portion of the ISDN signals received by transceiver 130 will be ported via high speed link 135 to the input/output pin 144 of processor 140 (at the 500 microsecond interrupt rate), so that the signalling channel may be read by the processor. Bearer (B) channel data on TDM bus 131 from the transceiver 130 is applied to SCCs 142 and 143 and serialized out from SCC 141 over the return portion of the bidirectional path 211 through MUX/DEMUX 170 to the DTE 14.

For the case of the user placing an analog call (for example, dialing a commercial internet interface provider, as described previously), when the call is initially placed, the micro-controller within the serial communication exchange processor 140 will decode the contents of the AT command supplied over the default path 211 through MUX/DEMUX 170, as an analog call.

In response to this analog channel-associated AT command, rather than provide the above-described ISDN connectivity byway of SCCs 142 and 143, the processor 140 will establish the third path connection 213 through MUX/DEMUX 170, so that a loop connection is provided from connector 121 through MUX/DEMUX 170 to connector 123, and exclusive of a path that includes SCC 141.

As a consequence the user's DTE 14 is now effectively in direct serial (RS 232) communication with the (DB 25) port 123 to modem 160. The (RS-232) data channel from the DTE 14 is thereby converted into analog format by the modem 160 and output from its analog port 163 to the terminal adapter's analog connector 124.

As in the first embodiment of FIG. 2, the micro-controller of the serial communication exchange processor 140 provides control signals to the codec circuitry within DAC 200-1, so that the analog data supplied to analog connector 124 is digitized by the DAC 200-1. The outgoing digitized data from codec 203-1 is then coupled over the TDM bus 131 to transceiver 130, which interfaces the digitized (bearer) channel data from the DAC 200-1 onto the subscriber loop 16.

In the incoming or return direction from a POTS line-associated server at the far end of the communication network to which the local loop 16 is connected, bearer (B) channel signals received from the local loop 16 by transceiver 130 are converted into analog format by DAC 201-1, and output via analog connector 124 to the analog port 163 of modem 160. Modem 160 outputs serial (RS-232) data from port 161 to the (DB 25) connector 123 of the terminal adapter, so that the data may be looped through MUX/DEMUX 170 to connector 121 for application to the COM port of the DTE 14.

Also, as in the first embodiment, where the user's data terminal equipment 14 uses an internal modem, the operation of the terminal adapter is substantially the same as that for use with an external modem 160, except that there is no connection to (DB 25) connector 123. For the case of an ISDN call, the user will have designated whichever port (e.g., COM 1 or COM 2) is connected to the connector 121 of the terminal adapter. The operation for an ISDN call is identical to that described above, as all connectivity takes place through the communication processor 140, without use of any modem.

For the case of the user placing an analog call, the user will have designated the communication port (e.g., COM 2 or COM 1) to which the internal modem is connected. The call will be directly applied from the internal modem port to the analog connector 124 and routed through the DAC 200-1, so that the analog signals supplied to the analog connector 124 are digitized by the DAC 200-1. The outgoing digitized data from the codec 203-1 is then coupled over the TDM bus 131 to the transceiver 130, which interfaces the digitized (bearer) channel data from the DAC onto the ISDN link 16, as described above.

In the incoming or return direction from a POTS line associated server at the far end of the communication network to which the local loop 16 is connected, the bearer (B) channel signals received from the local loop 16 by the transceiver 130 are converted into analog format by the DAC 200-1, and output via the analog connector 124 to the analog port of the DTE's internal modem.

As described above, by using the MUX/DEMUX 170 to provide shared and looped digital communication connectivity between digital data communication connectors 121 and 123 and a single serial communication controller 141 of the serial communication exchange processor, the terminal adapter of the second embodiment of the present invention is able to provide full serial communication connectivity between the customer's data terminal equipment and the ISDN communication link without the need for an auxiliary SCC unit to augment the serial communication connectivity inherent in the processor 140.

It should also be noted that the hardware (SCC) reduction mechanism employed in the second embodiment of the invention, which uses the high speed data port 133 of the ISDN transceiver 130 to directly access the D channel data through the non-maskable interrupt port 144 of the processor 144, has utility in digital communication applications other than in an ISDN terminal adapter.

For example, a variety of ISDN terminal equipment devices (which not only include terminal adapters, but also inverse multiplexers, routers, etc.) are required to perform serial communication framing, such as HDLC framing, on an ISDN D channel and both ISDN B channels, for data rate protocols, such as V.120 and Internet point-to-point and multipoint protocols (PPP and MP), usually necessitating three or more serial communication controllers per ISDN design.

Because serial communication exchange processors, such as the above-referenced Motorola 68302 processor, which contain internal serial communication controllers, are not inexpensive devices, they impart substantial cost to an overall system design. Of particular significance is the fact that such communication processors do not contain a sufficient number of high speed serial I/O devices to implement an entire system design.

For example, if Internet (PPP and MP) protocols are required by a given design specification, three serial communication (HDLC) controllers and an additional high speed universal asynchronous receiver transmitter (UART) would customarily be required.

As described above in connection with the first embodiment of the invention diagrammatically illustrated in FIG. 2, for a terminal adapter which supports Internet Multilink PPP/MP protocols, a fourth non-HDLC-like serial path for the DCE connection to the user's DTE is required. This fourth non-HDLC serial path is high speed (above 57.6 Kbps) in most applications and requires a direct memory access (DMA) path similar to the B channel HDLC data path. Since each additional high speed serial path employed adds to the overall cost of the system, elimination of such a path, as is achieved by the interrupt-driven (D) channel access scheme of the second embodiment of the present invention of FIG. 3, is effective to reduce the overall system cost.

It should also be noted that the multiplexer—demultiplexer 170 employed in the second embodiment of FIG. 3 may be installed in the first embodiment of FIG. 2, to provide the user a variety of data port connections from which to choose, including the auxiliary input/output pin 144 of the serial communication exchange processor 140 and the two auxiliary SCCs 181 and 182 contained in the auxiliary SCC unit.

As will be appreciated from the foregoing description, by using the customer's own modem (either internal of the customer's data terminal equipment or an external stand alone device), the terminal adapter of the present invention eliminates a major shortcoming of the prior art integrated terminal adapter solution, that effectively requires that the customer discard his own modem and pay an additional cost associated with the internal modem chipset of the integrated terminal adapter. Through the use of either an auxiliary serial communication controller unit or multiplexer, and associated serial data communication and analog communication connectors, the present invention is able to controllably route data between the user's DTE and the ISDN transceiver through the user's modem.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A communication adapter for providing communication connectivity between a digital information processing device and a communication link comprising:

a digital communication transceiver for transmitting and receiving digital communication signals on said digital communication link;

a first digital communication connector arranged to be coupled with a digital communication port of said digital information processing device;

a second digital communication connector arranged to be coupled with a digital communication port of a modem for use with said digital information processing device;

a first analog communication connector arranged to be coupled with an analog communication port of said modem;

a first analog/digital communication interface coupled between said first analog communication connector and said digital communication transceiver; and a serial communication exchange processor, which is coupled with said first and second digital communication connectors and said digital communication transceiver, and is operative to selectively provide either a first communication path therethrough, exclusive of said modem, between said first digital communication connector and said digital communication transceiver, so that digitally formatted communication may take place between said digital information processing device and said communication link, or a second communication path that is inclusive of said modem, said first analog/digital communication interface and said digital communication transceiver, so that digitally formatted communication may take place through said modem between said digital information processing device and said communication link.

2. A communication interface according to claim 1, wherein said serial communication processor includes first and second serial communication controllers respectively coupled to said first and second digital communication connectors, and a third serial communication controller coupled to said digital communication transceiver, and wherein said serial communication exchange processor is operative to selectively provide serial communication connectivity between said first serial communication controller and said third serial communication controller and thereby provide said first communication path between said digital information processing device and said digital communication transceiver.

3. A communication interface according to claim 1, wherein said serial communication processor includes first and second serial communication controllers respectively coupled to said first and second digital communication connectors, and wherein said serial communication processor is operative to provide said second communication path through said first digital communication connector, said first serial communication controller, said second serial communication controller, said second digital communication connector, said modem, said first analog communication connector, and said first analog/digital communication interface to said digital communication transceiver.

4. A communication interface according to claim 1, further including a communication multiplexer—demultiplexer having first and second ports respectively coupled to said first and second digital communication connectors and a third port, and wherein said serial communication processor includes a first serial communication controller coupled to said third port of said communication multiplexer—demultiplexer, and a second serial communication controller coupled to said digital communication transceiver, and wherein said serial communication exchange processor is operative to selectively provide said first communication path between said first digital communication connector, through said communication multiplexer—demultiplexer, to said first serial communication controller, and between said first and said second serial communication controllers, so as to provide said first communication path through said multiplexer—demultiplexer between said digital information processing device and said digital communication transceiver.

5. A communication interface according to claim 1, wherein said serial communication processor includes a first serial communication controller, and further including a communication multiplexer—demultiplexer having first and second ports respectively coupled to said first and second digital communication connectors, and a third port coupled to said first serial communication controller, and wherein said serial communication exchange processor is operative to selectively provide said communication path between said first digital communication connector, through said communication multiplexer—demultiplexer, to said second digital communication connector, and thereby provide said second communication path through said multiplexer—demultiplexer and said modem between said digital information processing device and said digital communication transceiver.

6. A communication interface according to claim 5, wherein said serial communication processor further includes a second serial communication controller coupled to said digital communication transceiver, and wherein said serial communication exchange processor is operative to selectively provide said first communication path between said first digital communication connector, through said communication multiplexer—demultiplexer, to said first serial communication controller, and between said first and said second serial communication controllers, so as to provide said first communication path through said multiplexer—demultiplexer between said digital information processing device and said digital communication transceiver.

7. A communication interface according to claim 1, wherein said digital communication transceiver comprises an integrated services digital network transceiver.

8. A communication interface according to claim 2, wherein said digital communication transceiver comprises an integrated services digital network (ISDN) transceiver, and said serial communication exchange processor further includes fourth and fifth serial communication controllers respectively coupled to said digital communication transceiver, said fourth and fifth serial communication controllers being associated with bearer (B) data channels for ISDN communication of said ISDN transceiver.

9. A communication interface according to claim 4, wherein said digital communication transceiver comprises an integrated services digital network (ISDN) transceiver having a high speed data port, and wherein said serial communication exchange processor further includes an interrupt port directly coupled to said high speed data port of said digital communication transceiver for interfacing signalling (D) channel data for said ISDN transceiver under software control, and wherein said second serial communication controller is associated with a bearer (B) data channel for ISDN communication of said ISDN transceiver.

10. A communication interface according to claim 1, wherein said modem comprises a modem that is external to said digital information processing device.

11. A communication interface according to claim 10, wherein said second communication path that is inclusive of said modem includes a path between said second digital communication connector and said first analog communication connector.

12. A communication interface according to claim 1, wherein said modem comprises a modem that is internal of said digital information processing device.

13. A communication interface according to claim 12, wherein said second communication path that is inclusive of said modem includes a path containing said digital information processing device, said modem, said first analog communication connector and said first analog/digital communication interface.

14. A communication interface according to claim 1, further including a second analog communication connector arranged to be coupled with an analog communication device, and a second analog/digital communication interface coupled between said second analog communication connector and said digital communication transceiver.

15. An ISDN terminal adapter for providing communication connectivity between data terminal equipment and a communication circuit, and being operative to use a customer's modem for analog connectivity with said communication circuit, comprising an ISDN communication transceiver for transmitting and receiving ISDN-formatted communication signals over said communication circuit, a first digital communication connector coupled with a digital communication port of said data terminal equipment, a second digital communication connector coupled with a digital communication port of said modem, a first analog communication connector coupled with an analog port of said modem, a first analog/digital communication interface coupled between said first analog communication connector and said ISDN communication transceiver, and a serial communication exchange processor coupled with said first and second digital communication connectors and said ISDN communication transceiver, said processor being operative, in response to a request for digital connectivity with said communication circuit, to provide a first communication path, exclusive of said modem, between said first digital communication connector and said ISDN communication transceiver, so that ISND-formatted communications may take place between said data terminal equipment and said communication circuit, and, in response to a request for analog connectivity with said communication circuit, to provide a second communication path through said modem, said first analog communication connector, said first analog/digital communication interface and said ISDN communication transceiver, so that communications may take place between said data terminal equipment and said communication circuit.

16. An ISDN terminal adapter according to claim 15, further including a second analog communication connector arranged to be coupled with an analog communication device, and a second analog/digital communication interface coupled between said second analog communication connector and said ISND communication transceiver.

17. An ISDN terminal adapter according to claim 15, further including a communication multiplexer—demultiplexer having first and second ports respectively coupled to said first and second digital communication connectors and a third port, and wherein said serial communication processor includes a first serial communication controller coupled to said third port of said communication multiplexer—demultiplexer, and a second serial communication controller coupled to said ISDN communication transceiver, and wherein said serial communication exchange processor is operative to selectively provide said first communication path between said first digital communication connector, through said communication multiplexer—demultiplexer, to said first serial communication controller, and between said first and said second serial communication controllers, so as to provide said first communication path through said multiplexer—demultiplexer between said digital information processing device and said ISDN communication transceiver.

18. An ISDN terminal adapter according to claim 17, wherein said ISDN communication transceiver has a high speed data port, and wherein said serial communication exchange processor further includes an interrupt port directly coupled to said high speed data port of said ISDN communication transceiver for interfacing signalling (D) channel data for said ISDN communication transceiver under software control, and wherein said second serial communication controller is associated with a bearer (B) data channel for said ISDN communication transceiver.

19. For use with data terminal equipment and an associated modem, said modem having a digital communication port for connectivity with said data terminal equipment and an analog communication port for analog connectivity with a communication network, a terminal adapter which is operative to provide communication connectivity between said data terminal equipment and either of an analog or digital communication circuit, said terminal adapter comprising:

a digital communication transceiver for transmitting and receiving digital communication signals on a digital communication circuit;

a first digital communication connector configured for connection with a digital communication port of said digital terminal equipment;

a second digital communication connector configured for connection with said digital communication port of said modem;

a first analog communication connector configured for connection with said analog communication port of said modem;

a first analog/digital communication interface coupled between said first analog communication connector and said digital communication transceiver; and a communication processor which is operative to selectively provide one of a first serial communication path between said first digital communication connector and said digital communication transceiver, exclusive of said modem, so that digitally formatted communication may take place between said digital information processing device and said digital communication circuit exclusive of said modem, and a second communication path, inclusive of said modem by way of said second digital communication connector and said first analog communication port, so that digitally formatted communication may take place through said modem between said digital information processing device and said digital communication circuit.

20. A terminal adapter according to claim 19, further including a second analog communication connector arranged to be coupled with an analog communication device, and a second analog/digital communication interface coupled between said second analog communication connector and said digital communication transceiver.

21. A terminal adapter according to claim 19, wherein said communication processor includes a communication multiplexer—demultiplexer having first and second ports respectively coupled to said first and second digital communication connectors, a first serial communication controller coupled to a third port of said communication multiplexer—demultiplexer, and a second serial communication controller coupled to said digital communication transceiver, and wherein said communication processor is operative to selectively provide said first communication path between said first digital communication connector, through said communication multiplexer—demultiplexer, to said first serial communication controller, and between said first and said second serial communication controllers, thereby providing said first communication path through said multiplexer—demultiplexer between said digital information processing device and said digital communication transceiver to said digital circuit.

22. A terminal adapter according to claim 21, wherein said digital communication transceiver comprises an integrated services digital network (ISDN) transceiver.

23. A terminal adapter according to claim 22, wherein said ISDN transceiver has a high speed data port, and wherein said serial communication exchange processor further includes an interrupt port directly coupled to said high speed data port of said ISDN transceiver for interfacing signalling (D) channel data for said ISDN transceiver under software control, and wherein said second serial communication controller is associated with a bearer (B) data channel for said ISDN transceiver.

24. A terminal adapter according to claim 19, wherein said modem comprises a modem that is external to said data terminal equipment.

25. For use with data terminal equipment and an associated modem, said modem having an analog communication port that is configured for analog connectivity with a POTS communication network, and a digital communication port, a method of providing digital communication connectivity between said data terminal equipment and a digital communication link for said communication network, said method comprising the steps of:

(a) providing a digital communication transceiver for transmitting and receiving digital communication signals on said digital communication link;

(b) connecting a first digital communication connector with a digital communication port of said user's digital terminal equipment;

(c) connecting a second digital communication connector with the digital communication port of said modem;

(d) connecting a first analog communication connector with the analog communication port of said modem;

(e) coupling a first analog/digital communication interface between said first analog communication connector and said digital communication transceiver; and (f) selectively providing one of a first communication path between said first digital communication connector and said digital communication transceiver, exclusive of said modem, so that digitally formatted communication may take place between said digital information processing device and said digital communication link, and a second communication path, inclusive of said modem by way of said second digital communication connector, said first analog communication connector, and said first analog/digital communication interface, so that digitally formatted communication may take place through said modem between said digital information processing device and said digital communication link.

26. A method according to claim 25, further including the step (g) of connecting a second analog communication connector with an analog communication device, and providing a second analog/digital communication interface between said second analog communication connector and said digital communication transceiver, so that so that communication may take place through said second analog/digital communication interface between said analog communication device and said digital communication link.

27. A method according to claim 25, wherein step (f) further includes coupling first and second ports of a communication multiplexer—demultiplexer to said first and second digital communication connectors, coupling a third port of said communication multiplexer—demultiplexer to a first serial communication controller, and coupling a second serial communication controller to said digital communication transceiver, and selectively providing said first communication path between said first digital communication connector, through said communication multiplexer—demultiplexer, to said first serial communication controller, and between said first and said third serial communication controllers and thereby provide said first communication path through said multiplexer—demultiplexer between said digital information processing device and said digital communication transceiver.

28. A method according to claim 27, wherein said digital communication transceiver comprises an integrated services digital network (ISDN) transceiver.

29. A method according to claim 28, wherein said ISDN transceiver has a high speed data port, and wherein said serial communication exchange processor further includes an interrupt port directly coupled to said high speed data port of said ISDN transceiver for interfacing signalling (D) channel data for said ISDN transceiver under software control, and wherein said second serial communication controller is associated with a bearer (B) data channel for said ISDN transceiver.

30. A method according to claim 25, wherein said modem is external to said data terminal equipment.

31. A method of providing data communication connectivity between a data processing device and a digital communication link for a communication network, said method comprising the steps of:

(a) providing a digital communication transceiver for transmitting and receiving digital communication signals on said digital communication link, said digital communication transceiver having a high speed data port;

(b) providing a serial communication exchange processor, including a plurality of serial communication controllers and an interrupt port;

(c) providing a first communication path for conveying digital communication signals between a first serial communication controller of said serial communication exchange processor and said data processing device;

(d) providing a second communication path for conveying a first type of data between a second serial communication controller of said serial communication exchange processor and said digital communication transceiver; and (e) conveying a second type of data between said digital communication transceiver and said serial communication exchange processor by directly coupling said interrupt port of said serial communications exchange processor to said high speed data port of said digital communication transceiver, and conducting interrupt-based data communications between said high speed data port of said digital communication transceiver and said interrupt port of said serial communications exchange processor.

32. A method according to claim 31, wherein said digital communication transceiver comprises an integrated services digital network (ISDN) transceiver, and wherein said first type of data comprises bearer (B) channel data and second type of data comprises signalling (D) channel data.

33. An arrangement for providing data communication connectivity between a data processing device and a digital communication link for a communication network comprising:

a digital communication transceiver which is operative to transmit and receive digital communication signals on said digital communication link, said digital communication transceiver having a high speed data port;

a serial communication exchange processor which includes a plurality of serial communication controllers and an interrupt port which is directly coupled to said high speed data port of said digital communication transceiver;

a first communication path for conveying digital communication signals between a first serial communication controller of said serial communication exchange processor and said data processing device;

a second communication path for conveying a first type of data between a second serial communication controller of said serial communication exchange processor and said digital communication transceiver; and wherein said serial communications exchange processor is programmed to conduct interrupt-based data communications between said interrupt port thereof and said high speed data port of said digital communication transceiver, and thereby convey a second type of data between said serial communication exchange processor and said said digital communication transceiver.

34. An arrangement according to claim 32, wherein said digital communication transceiver comprises an integrated services digital network (ISDN) transceiver, and wherein said first type of data comprises bearer (B) channel data and second type of data comprises signalling (D) channel data.

* * * * *